United States Patent
Thyagharajan et al.

(10) Patent No.: US 11,734,856 B2
(45) Date of Patent: *Aug. 22, 2023

(54) ADAPTIVE VIRTUAL CAMERA FOR INDIRECT-SPARSE SIMULTANEOUS LOCALIZATION AND MAPPING SYSTEMS

(71) Applicant: INTEL CORPORATION, Santa Clara, CA (US)

(72) Inventors: Anirud Thyagharajan, Bengaluru (IN); Om J Omer, Bangalore (IN)

(73) Assignee: Intel Corporation, Santa Clara, CA (US)

(*) Notice: Subject to any disclaimer, the term of this patent is extended or adjusted under 35 U.S.C. 154(b) by 78 days.

This patent is subject to a terminal disclaimer.

(21) Appl. No.: 17/465,637

(22) Filed: Sep. 2, 2021

(65) Prior Publication Data
US 2021/0398320 A1    Dec. 23, 2021

Related U.S. Application Data

(63) Continuation of application No. 16/706,079, filed on Dec. 6, 2019, now Pat. No. 11,158,087.

(51) Int. Cl.
*G06T 7/80* (2017.01)
*G06T 7/73* (2017.01)
*G06T 7/50* (2017.01)

(52) U.S. Cl.
CPC .......... *G06T 7/80* (2017.01); *G06T 7/50* (2017.01); *G06T 7/73* (2017.01); *G06T 2207/10028* (2013.01); *G06T 2207/30244* (2013.01)

(58) Field of Classification Search
CPC .... G06T 7/80; G06T 7/50; G06T 7/73; G06T 2207/10028; G06T 2207/30244; G06T 7/579; G06T 7/246
USPC ........................................................ 382/103
See application file for complete search history.

(56) References Cited

U.S. PATENT DOCUMENTS

| | | |
|---|---|---|
| 2017/0124713 A1 | 5/2017 | Jurgenson et al. |
| 2018/0307310 A1 | 10/2018 | McCombe et al. |
| 2019/0166359 A1 | 5/2019 | Lapstun |
| 2019/0304170 A1 | 10/2019 | Meilland |
| 2020/0005521 A1 | 1/2020 | Youngquist et al. |
| 2020/0104969 A1 | 4/2020 | Aratani |
| 2020/0111233 A1* | 4/2020 | Thyagharajan ......... G06T 7/246 |

(Continued)

FOREIGN PATENT DOCUMENTS

| | | | | |
|---|---|---|---|---|
| KR | 20220107596 | * | 8/2022 | ............ G06T 19/20 |
| WO | WO2019098318 | * | 5/2019 | ........... G01S 17/894 |

OTHER PUBLICATIONS

Office Action for U.S. Appl. No. 16/706,079, dated Mar. 18, 2021.
(Continued)

*Primary Examiner* — Jerome Grant, II
(74) *Attorney, Agent, or Firm* — Essential Patents Group, LLP

(57) ABSTRACT

Techniques related to indirect sparse simultaneous localization and mapping (SLAM) are discussed. Such techniques include adaptively positioning a virtual camera relative to an estimated position of a physical camera within an environment to be mapped, projecting a depth error to an image plane corresponding to the adaptive camera position, and using the projected depth error to update a mapping of the environment.

20 Claims, 8 Drawing Sheets

(56) References Cited

U.S. PATENT DOCUMENTS

2020/0126257 A1 4/2020 Tauber
2020/0388048 A1* 12/2020 Nilosek .................. G06V 20/13

OTHER PUBLICATIONS

Notice of Allowance for U.S. Appl. No. 16/706,079, dated Jul. 8, 2021.
Burri, et al., "The EuRoC micro aerial vehicle datasets", The International Journal of Robotics Research, pp. 1157-1163, 2016.
Cvisic, et al., "Soft-SLAM: Computationally efficient stereo visual SLAM for autonomous UAVS", Journal of Field Robotics, 2017.
Davison, et al., "Monoslam: Real-time single camera slam", IEEE Transactions on Pattern Analysis & Machine Intelligence, vol. 29, No. 6, Jun. 2007.
Engel, et al., "Direct sparse odometry", IEEE transactions on pattern analysis and machine intelligence 40.3, pp. 611-625, (2018).
Engel, et al., "LSD-SLAM: Large-scale direct monocular SLAM", European Conference on Computer Vision, Springer, 2014.
Heyden, et al., "Multiple view geometry", Emerging Topics in Computer Vision, 2005.
Jin, et al., "Real-time 3d motion and structure of point features: a front-end system for vision-based control and interaction", Proceedings of the IEEE Conference on Computer Vision and Pattern Recognition, vol. 2, pp. 778-779, 2000.
Jones, et al., "Visual-inertial navigation, mapping and localization: A scalable real-time causal approach", International Journal of Robotics Research, vol. 30, No. 4, pp. 407-430, Apr. 2011.
Klein, et al., "Parallel tracking and mapping for small AR workspaces", 6th IEEE and ACM International Symposium on Mixed and Augmented Reality (ISMAR), pp. 225-234, 2007.
Mur-Artal, et al., "Orb-slam2: An open-source slam system for monocular, stereo, and rgb-d cameras", IEEE Transactions on Robotics 33.5, pp. 1255-1262 (2017).
Nguyen, et al., "Modeling kinect sensor noise for improved 3d reconstruction and tracking", Second International Conference on 3D Imaging, Modeling, Processing, Visualization and Transmission (3DIMPVT), Oct. 13, 2012.
Pirchheim, et al., "Handling pure camera rotation in keyframe-based SLAM", IEEE International Symposium on Mixed and Augmented Reality (ISMAR), pp. 229-238, 2013.
Strasdat, et al., "Double window optimisation for constant time visual slam", IEEE Conference on Computer Vision (ICCV), pp. 2352-2359, 2011.
Sturm, et al., "A benchmark for the evaluation of RGB-D SLAM systems", IEEE/RSJ International Conference on Intelligent Robots and Systems (IROS), 2012.

* cited by examiner

ND MAPPING SYSTEMS

CLAIM FOR PRIORITY

This application is a continuation of, and claims the benefit of priority to U.S. patent application Ser. No. 16/706,079, filed on Dec. 6, 2019, titled "ADAPTIVE VIRTUAL CAMERA FOR INDIRECT-SPARSE SIMULTANEOUS LOCALIZATION AND MAPPING SYSTEMS", and which is incorporated by reference in its entirety.

BACKGROUND

Simultaneous localization and mapping (SLAM) is a fundamental building block for various autonomous applications in robotics and other fields. For example, SLAM is used in navigation, robotic mapping, odometry, virtual reality, augmented reality, and other applications. Among SLAM techniques, indirect-sparse methods have been widely adopted due to better performance and computational efficiency as well as not suffering from inherent biases due to geometric priors and providing a wide range of photometric and geometric invariance. In general, estimating an accurate pose is a prime objective of SLAM systems. Such poses (e.g., location and orientation of a camera or system within a coordinate system defined for an environment as well as the location of objects within the environment) must be estimated amidst sensor noise, processing inaccuracies (e.g., feature detection & tracking), dynamic scenarios (e.g., moving objects, occlusions), and other factors. Therefore, there is a need for SLAM systems to adopt rigorous pose optimization processes.

Current sparse indirect SLAM methods perform pose estimation by inferring 3D geometry from sets of keypoint matches. For loss formulation in the optimization process, a 3D geometric error represented as a distance between a 3D feature (e.g., obtained by back-projecting a detected 2D-feature using depth data) and a map-point (e.g., a SLAM system's current estimate of a landmark corresponding to the feature). However, with most depth sensors (e.g., active or passive stereo, structure from motion, and other modalities), the accuracy of depth estimation is inversely proportional to the depth. This can yield high geometric errors for objects/landmarks that are further away from the camera (as compared to objects closer to camera), which can severely impact the optimization process resulting in lower fidelity pose estimation. To address this, current sparse indirect SLAM methods re-project 3D geometric error back to the image plane and use this re-projection error in the optimization process. Although this normalized representation of the geometric error with respect to depth improves pose estimation fidelity by removing biases towards farther objects/landmarks, the re-projection error squashes the depth component of geometric error causing negative impact on pose estimation.

There is an ongoing need for high quality pose estimation in SLAM systems. It is with respect to these and other considerations that the present improvements have been needed. Such improvements may become critical as the desire to implement SLAM in a wide variety of contexts such as navigation, robotics, odometry, virtual reality, augmented reality, etc. becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
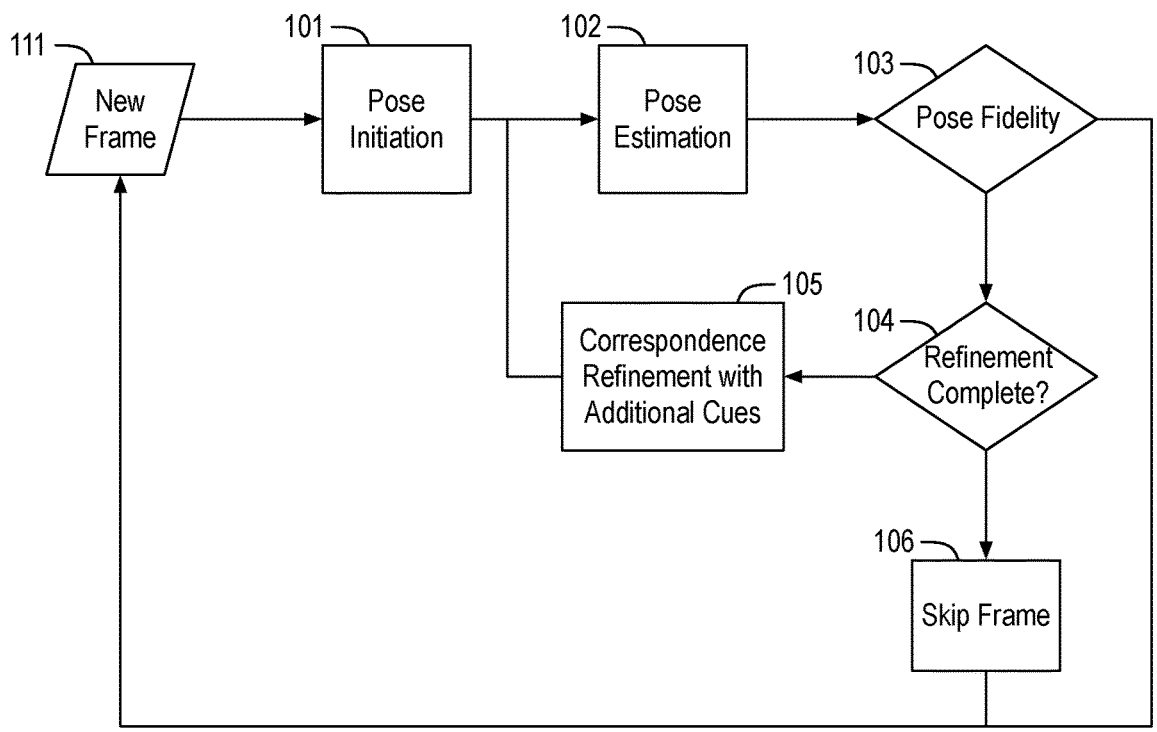
FIG. 1 illustrates an example system for performing simultaneous localization and mapping.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or examples, or embodiments, etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein. The terms "substantially," "close," "approximately," "near," and "about," generally refer to being within +/−10% of a target value.

Methods, devices, apparatuses, computing platforms, and articles are described herein related to adaptive virtual cameras for indirect-sparse SLAM techniques that provide adaptive locations for virtual cameras based on the geometry of a physical camera location, a detected feature, and a current estimated location of the landmark corresponding to the detected feature.

As described above, in a variety of contexts, it is desirable to estimate an accurate pose of a camera or camera system within an environment and to estimate positions of landmarks within the environment. Such information is employed in a wide range of applications such as navigation, robotic mapping, odometry, virtual reality, augmented reality, etc. Notably, such techniques seek to construct and/or update a map of an unknown environment while simultaneously keeping track of pose of a camera or system within the unknown environment while neither the system pose or the environment map are known.

As discussed below, in some embodiments, an estimated physical camera pose for a physical camera within an environment is attained. For example, the estimated physical camera pose may include a pose estimate of a physical camera such that the estimate was determined at a prior iteration (or at an initialization). As used herein, the term position within an environment includes at least a spatial position of the item (e.g., x, y, and z coordinates of the item within a coordinate system applied to the environment). The term pose includes at least the position and may also include an orientation of the item such as a pitch, yaw, and roll of the item or similar orientation information relative to the coordinate system. As used herein, the term orientation of an item indicates the pitch, yaw, and roll of the item. Such position and orientation information may be described collectively as a pose of the item; however, as discussed, the term pose may include only position information in some contexts. In some embodiments, it may be useful to estimate full pose information for some items in the environment and, in particular, the camera or camera system employed in the environment while only position information may be needed for other objects in the environment. The term environment includes any suitable physical space in which SLAM is being employed and the environment may include any landmarks or obstacles. Notably, after an iteration of SLAM processing, the pose of the camera system and the locations of landmarks within the environment may be updated and such iterations are repeated to improve the estimate of the camera system pose and landmark position as additional information is attained and analyzed. As used herein, the term landmark indicates any object or portion thereof within the environment. Notably, the techniques discussed herein generate error information that is used, along with other error information learned from other cameras within the environment (if employed) and/or other cues learned about the environment from other systems and sensors employed on the camera system and/or within the environment (if employed). The error information generated as discussed herein may be employed in any error function, optimization problem, energy optimization model, objective function, etc. that seeks to update the camera pose and landmark information.

Further to the estimated physical camera pose, an estimated landmark position for a landmark within the environment and an estimated feature point position within the environment for the landmark are also received. The estimated landmark position is a position of the landmark from a previous iteration (or an initialization position). As discussed, the estimated landmark position includes a data structure to represent a position of a landmark within the environment (e.g., x, y, and z coordinates). The estimated feature point position also corresponds to the landmark but includes an estimate of the position of the landmark for the current iteration. For example, the estimated feature point position may be based on detection of the landmark within a current image captured by the camera system and back projection of the feature landmark to the coordinate system of the environment from the landmark. The depth information used to back project the detected feature may be any suitable depth information attained using any suitable technique or techniques such as stereoscopic matching techniques (e.g., based on the image from the camera system and a second camera system), stereoscopic matching between an IR transmitter and an IR imaging device, etc.

In any event, a 3D error may exist between the estimated landmark position and the estimated feature point position. Such 3D error information may be used in estimating a new estimated landmark position for the landmark at the current iteration. Notably, the new estimated landmark position is not simply changed to the estimated feature point position as estimation of the camera pose, landmark positions, etc. within the environment provides a complex problem with the positions influencing other errors in the system. Such error terms for many landmarks, information or errors from other cues from the environment, and so on may be used to define a problem that may be estimated using error energy minimization techniques, bundle adjustment techniques, and the like. Notably, the techniques discussed herein advantageously capture a depth error component of the 3D error between the estimated landmark position and the estimated feature point position based on locating a virtual camera within the environment and projecting an error corresponding to the 3D error onto an image plane corresponding to the virtual camera pose. As used herein, the term virtual camera indicates a viewpoint generated for use in error projection and, as the term virtual indicates, no such actual camera is provided at the location. Herein, the terms image plane and camera plane are used interchangeably.

Using the estimated physical camera pose, the estimated feature point position, and the estimated landmark position, a virtual camera pose for the virtual camera is determined within the environment. Notably, the virtual camera pose is offset in both a horizontal direction and a vertical direction with respect to the estimated physical camera pose. As used herein, the term horizontal direction and vertical direction are defined orthogonal to a camera line (e.g., the direction the camera is pointing) of the estimated physical camera pose. The horizontal is therefore along an x-axis of the image plane of the physical camera and the vertical is along a y-axis of the image plane of the physical camera such that the term along in this context indicates the directions are planar parallel. For example, the virtual camera pose and the estimated physical camera pose may be co-planar and parallel to the image plane of the physical camera, which is also the image plane of the virtual camera.

Furthermore, the pose of the virtual camera is generated using the estimated physical camera pose, the estimated feature point position, and the estimated landmark position such that the pose (including position) of the virtual camera is adaptive within the environment. Such techniques may be contrasted with techniques that locate a virtual camera pose at a fixed distance and direction from the estimated physical camera pose.

An error corresponding to the 3D error between the estimated feature point position and the estimated landmark position is then projected to an image plane corresponding to the virtual camera pose using the position of the virtual camera to provide a depth error component or projected depth error corresponding to the 3D error. By adaptively locating the virtual camera pose using the estimated physical camera pose, the estimated feature point position, and the estimated landmark position, the projected depth error component is advantageously maintained in any geometry between the estimated physical camera pose, the estimated feature point position, and the estimated landmark position. Furthermore, an error is generated for the landmark that includes, along with the projected depth error, planar error between the estimated feature point position and the estimated landmark position that is along the image plane of the physical camera.

Thereby, the error term generated based on the estimated feature point position and the estimated landmark position provides robust error in all dimensions (x, y along the image plane and z based on the projected depth error). Such error terms (including depth error components) may be generated for any number of landmarks within the environment (e.g., those landmarks detected within the current image from the physical camera). Furthermore, the landmark error terms and error terms or information from other cues within the environment, implemented sensors, etc. may be gathered and a new estimated physical camera pose and/or estimated landmark positions (for landmarks detected within the current image and, optionally, other landmarks in the mapping) are determined using the error information. Notably, an updated map of the environment may be generated at each iteration such that the map includes the pose of the camera system and locations of landmarks within the environment.

FIG. 1 illustrates an example system 100 for performing simultaneous localization and mapping, arranged in accordance with at least some implementations of the present disclosure. As shown in FIG. 1, system 100 includes a pose initiation module 101, a pose estimation module 102, a pose fidelity module 103, a refinement completion module 104 (labeled as "Refinement Complete"), a correspondence refinement module 105 (labeled as "Correspondence Refinement with Additional Cues"), and a skip frame module 106. Herein, discussion is focused on pose estimation module 102. Pose estimation module 102 receives or maintains prior mappings of an environment including an estimated physical camera pose, estimated landmark positions, and estimated feature point positions as discussed further herein. Pose estimation module 102 may also receive other error information or data to generate such errors from correspondence refinement module 105, which may use additional cues regarding the environment and correspondences between images from other cameras, correspondences between landmarks, etc. to provide information for error minimization and/or mapping optimization.

Pose estimation module 102 outputs updated or new estimated physical camera poses and updated or new estimated landmark positions based on solving or estimating a solution to a model incorporating such error terms and information. Pose estimation module 102 may solve or estimate the solution to the model using any suitable technique or techniques known in the art such as energy minimization techniques, bundle adjustment techniques, etc. Notably, an error between an estimated landmark position and an estimated feature point position (both for the same landmark) is generated based on providing a pose for a virtual camera and projecting a 3D error onto an image plane corresponding to the virtual camera pose to determine a depth error. The updated or new estimated physical camera poses and updated or new estimated landmark positions are, in turn, generated based on or using the depth error component (along with other errors collected for the current iteration).

As shown, pose initiation module 101 (and system 100 in general) receives a current or new frame 111. New frame 111 is received from a physical camera within the environment. New frame 111 may include any suitable video frame, video picture, image, video or image data, or the like in any suitable resolution and format. For example, new frame 111 may be video graphics array (VGA), high definition (HD), Full-HD (e.g., 1080p), 2K resolution video, 4K resolution video, or 8K resolution video. In some embodiments, new frame 111 is downsampled prior to processing. Techniques discussed herein are discussed with respect to frames for the sake of clarity of presentation. However, such frames may be characterized as pictures, images, image data, etc. In some embodiments, new frame 111 has three channels such as RGB channels, although other formats such as YUV, YCbCR, etc. may be used. Pose initiation module 101 may perform landmark detection, landmark back projection, and pose initiation based on new frame 111 to generate a data structure used by pose estimation module 102.

Furthermore, the updated or new estimated physical camera poses and updated or new estimated landmark positions are provided to pose fidelity module 103, which may further refine the estimated physical camera pose or pose and the updated estimated landmark positions, and to refinement completion module 104, which may determine whether the pose estimation and/or refinement should be incorporated into the mapping of the environment or whether the pose estimation and/or refinement should be discarded in whole or in part as indicated with respect to skip frame module 106, which may cause a skipping of updating of the mapping using the current frame.

Thereby, system 100 updates, for any number of iterations, a mapping of a 3D environment. The mapping may include any data structures indicative of the 3D environment such as an estimated physical camera pose, estimated feature point positions, etc. Furthermore, the 3D environment may be any environment and a 3D coordinate system may be applied onto the environment such that the 3D coordinate system has an origin at some position therein and an x, y, z system in any orientation.

Figure 2:
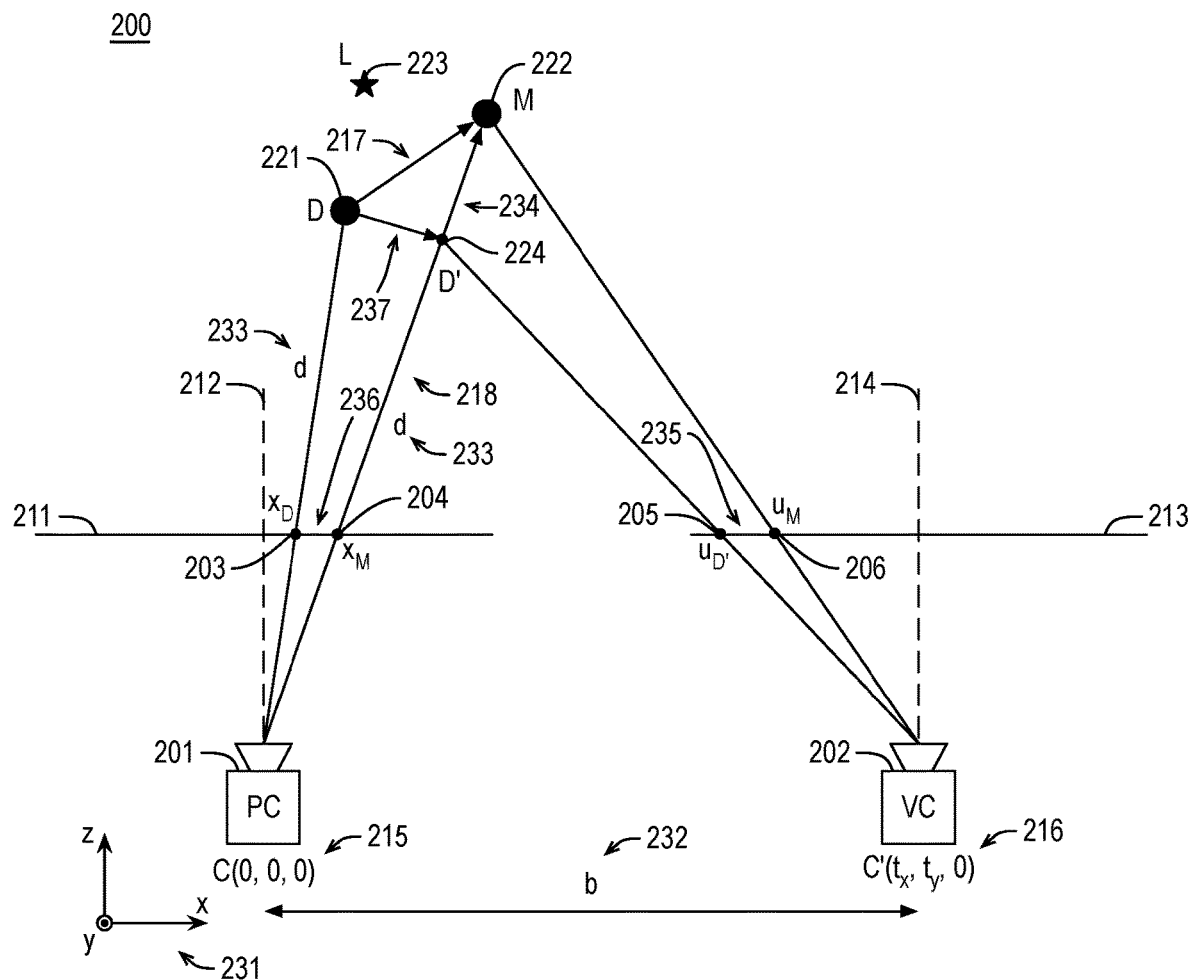
FIG. 2 illustrates an example 3D environment including a landmark and a physical camera therein.

FIG. 2 illustrates an example 3D environment 200 including a landmark 223 and a physical camera 201 therein, arranged in accordance with at least some implementations of the present disclosure. Physical camera 201 may be implemented via any system that is mobile within environment 200. Physical camera 201 attains frames or images within environment 200 and the system employing physical camera 201 or a system in communication with physical camera 201 receives the frames or images as well as other information, such as positional or motion information of the system, other sensor data, etc. The processing system then attempts to map landmarks and provide a pose of physical camera 201 within environment 200.

As shown, at a previous iteration, the mapping indicates landmark 223 (L) is at an estimated landmark position 222 (M). That is, landmark 223 indicates an actual landmark within 3D environment 200 that the mapping is attempting to locate accurately. At a previous iteration, landmark 223 has been estimated as having estimated landmark position 222. Estimated landmark position 222 may include any suitable data structure indicative of an estimated position of landmark 223 such as 3D coordinates (e.g., an x value, a y value, and a z value) based on coordinate system 231 as overlaid onto environment 200. Furthermore, the previous iteration indicates physical camera 201 is at an estimated physical camera pose 215 (C). As with estimated landmark position 222, estimated physical camera pose 215 may include any suitable data structure indicative of an estimated position within 3D environment 200.

In the illustrated embodiment, coordinate system 231 is based on physical camera 201 such that the origin is at the position of estimated physical camera pose 215 as indicated as (0, 0, 0) and coordinate system 231 is oriented based on the pose such that the z-axis of coordinate system 231 is aligned with camera line 212 of physical camera 201. Therefore, image plane 211 is parallel to the x-y plane of coordinate system 231. Furthermore, it is noted that image plane 211 and virtual image plane 213, although illustrated separately, may be the same plane. Coordinate system 231 based on estimated physical camera pose 215 may be used for the sake of simplicity. However, coordinate system 231 may have any origin and predefined orientation.

Based on a current frame (e.g., new frame 111) as captured by physical camera 201, a feature point 203 ($x_D$) is detected within the current frame. Feature point 203 may be detected using any suitable techniques such as feature detection, feature extraction, etc. Notably, feature point 203 is detected as being representative of landmark 223 and such information may be used to update the position of estimated landmark position 222 and/or estimated physical camera pose 215 within the mapping of environment 200.

Feature point 203, as attained on image plane 211 (e.g., the image plane of the current frame) is back projected to an estimated feature point position 221 (D) such that estimated feature point position 221 may include any suitable data structure indicative of an estimated position of landmark 223. As shown, a 3D error 217 exists between estimated feature point position 221 and estimated landmark position 222 such that the previous iteration estimate (estimated landmark position 222) and the current iteration estimate (estimated feature point position 221) have a 3D error therebetween. This 3D error is then used to improve estimated landmark position 222 by providing a new or updated position thereof and/or estimated physical camera pose 215 by providing a new or updated position and orientation thereof.

As shown in FIG. 2, based on estimated physical camera pose 201, estimated feature point position 221, and estimated landmark position 222, a virtual camera pose 216 ($t_x$, $t_y$, 0) for a virtual camera 202 is generated. Notably, virtual camera pose 216 may be offset in the horizontal ($t_x$) and vertical ($t_y$) direction with respect to estimated physical camera pose 201 while no offset is provided in the z-axis. Furthermore, estimated physical camera pose 201 and virtual camera pose 216 have the same orientations (in terms of pitch, yaw, and roll) such that they share the same image planes 211, 213 or such that image planes 211, 213 are parallel. Notably, virtual camera 202 may be modeled as having the same characteristics (e.g., focal length) as physical camera 201. Virtual camera pose 216 is therefore offset in both a horizontal direction and a vertical direction with respect to estimated physical camera pose 215 while virtual camera pose 216 has no offset in a depth direction with respect to estimated physical camera pose 215 and virtual camera pose 216 and estimated physical camera pose 215 have the same orientations. Notably, estimated physical camera pose 215 and virtual camera pose 216 are coplanar in the x-y plane (i.e., a plane parallel to image plane 211).

Virtual camera pose 216 may be determined using any suitable technique or techniques that provide an adaptive virtual camera pose 216 based on estimated physical camera pose 201, estimated feature point position 221, and estimated landmark position 222. In some embodiments, virtual camera pose 216 is determined using a modified estimated feature point position 224 (D') for estimated feature point position 221. Virtual camera pose 216 is then provided at a position from estimated physical camera pose 201 that is aligned with a projection of a vector 237 from estimated feature point position 221 to modified estimated feature point position 224 and that is a predetermined distance 232 (b) from estimated physical camera pose 201. In some embodiments, the projection is a projection of vector 237 from estimated feature point position 221 to modified estimated feature point position 224 onto the x-y plane (e.g., a plane parallel to image plane 211). That is, virtual camera pose 216 may be provided at predetermined distance 232 from estimated physical camera pose 201 located at a position aligned with an x-y plane projection of the vector from estimated feature point position 221 to modified estimated feature point position 224 with no change in the z axis. Furthermore, as discussed, the virtual camera pose 216 has no orientation change with respect to estimated physical camera pose 215.

Modified estimated feature point position 224 may be generated using any suitable technique or techniques that maintains the depth component of 3D error 217 with respect to a virtual image plane 213 corresponding to virtual camera pose 216. In some embodiments, modified estimated feature point position 224 is along a depth axis 218 extending from estimated physical camera pose 215 to estimated landmark position 222 and at a distance 233 (d) along depth axis 218 equal to distance 233 (d) from estimated physical camera pose 215 to estimated feature point position 221.

Figure 3:
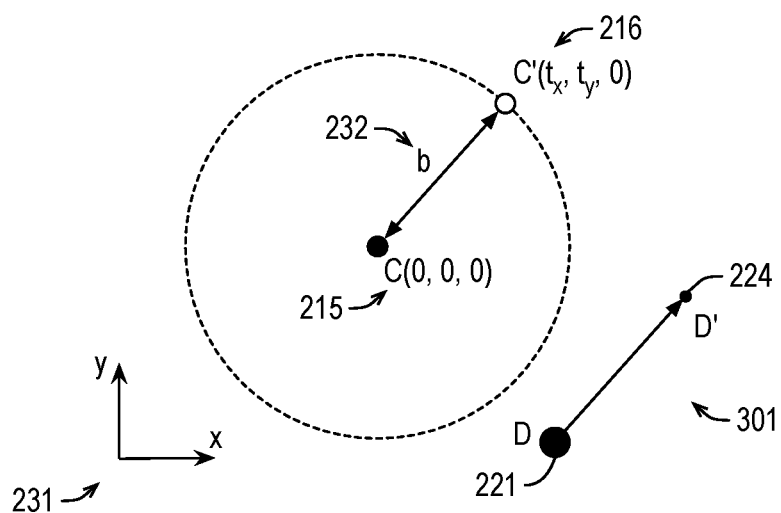
FIG. 3 illustrates an example virtual camera pose with respect to an example estimated physical camera pose.

FIG. 3 illustrates an example virtual camera pose 216 with respect to an example estimated physical camera pose 215, arranged in accordance with at least some implementations of the present disclosure. As shown in FIG. 3, given estimated physical camera pose 215, virtual camera pose 216 is determined such that virtual camera pose 216 is coplanar with the x-y plane of coordinate system 231, coplanar with a plane orthogonal to a camera line 212 of physical camera 201 (please refer to FIG. 2), and coplanar with a plane parallel to image plane 211. Furthermore, virtual camera pose 216 is at distance 232 from estimated physical camera pose 215. Distance 232 may be any suitable predetermined distance. In some embodiments, distance 232 is in the range of 1.5 cm to 15 cm. In some embodiments, distance 232 is in the range of 5 cm to 10 cm. In some embodiments, distance 232 is a distance between physical camera 201 and a second physical camera (not shown) such that estimated feature point position 221 (please refer to FIG. 2) is based on stereoscopic techniques using images attained using physical camera 201 and the second physical camera. That is, distance 232 may be a distance between physical cameras used to detect depth in environment 200. Notably, the discussed techniques may provide robust error terms with respect to variations in distance 232 as the depth error is maintained in all geometries with respect to estimated physical camera pose 215, estimated feature point position 221, and estimated landmark position 222. In some embodiments, distance 232 may be greater when a depth sensor is more accurate and smaller when a depth sensor is less accurate.

Furthermore, virtual camera pose 216 is offset with respect to estimated physical camera pose 215 in a direction 301 that is along a projection of vector 237 from estimated feature point position 221 to modified estimated feature point position 224 onto image plane 211, onto the x-y plane, or onto any plane orthogonal to camera line 212. Thereby, virtual camera pose 216 is provided such that, with respect to estimated physical camera pose 215, virtual camera pose 216 may have both an x offset and a y offset (i.e., $t_x$, $t_y$, respectively, providing horizontal and vertical offsets) in a plane parallel to image planes 211, 213.

Returning now to FIG. 2, virtual camera pose 216 and the characteristics used to model virtual camera 202 define image plane 213 orthogonal to a camera line 214 of virtual camera 202. Furthermore, as discussed, modified estimated feature point position 224 is generated using estimated physical camera pose 215, estimated feature point position 221, and estimated landmark position 222. A 3D error 234 (or virtual error component) corresponding to 3D error 217 is provided between modified estimated feature point position 224 and estimated landmark position 222. 3D error 234, corresponding to 3D error 217, is projected onto virtual image plane 213 of virtual camera 202. As shown, depth error projection 235 of 3D error 234 is generated by projecting modified estimated feature point position 224 to a projected point 205 ($u_D$) on virtual image plane 213 and estimated landmark position 222 to a projected point 206 ($u_M$), and differencing projected points 205, 206. Notably, depth error projection 235 may include a horizontal component and a vertical component with respect to virtual image plane 213.

Furthermore, estimated landmark position 222 is projected to a projected point 204 ($x_M$) on image plane 211 to provide an error projection 236 between projected point 204 and feature point 203. As with depth error projection 235, planar error projection 236 may include a horizontal component and a vertical component with respect to image plane 211. Depth error projection 235 and planar error projection 236 are then provided as an error corresponding to landmark 223 for the current iteration. In an embodiment, the combined error projection is provided as a vector of error components. For example, the error components may include a first term including a horizontal difference corresponding to planar error projection 236 (i.e., $x_M - x_D$), a second term including a vertical difference corresponding to planar error projection 236 (i.e., $y_M - y_D$), a third term including a horizontal difference corresponding to depth error projection 235 (i.e., $u_{M,x} - u_{D',x}$), and a fourth term including a vertical difference corresponding to depth error projection 235 (i.e., $u_{M,y} - m_{D',y}$). Such error terms are discussed further below.

The error for landmark 223 at the current iteration is then used, along with errors for other landmarks, other cues, and so on to provide new estimates for estimated landmark position 222 and/or estimated physical camera pose 215 as discussed with respect to FIG. 1. In some embodiments, estimated physical camera pose 215 is maintained as the origin and all adjustments are made with respect to estimated landmark positions. Such techniques may provide an estimated solution to a complex objective function, energy minimization model, or the like using any suitable techniques such as bundle adjustment techniques to generate a new mapping of environment 200. As discussed, for new frame 111, an error for each of any number of landmarks may be used in determining the new mapping.

Figure 4:
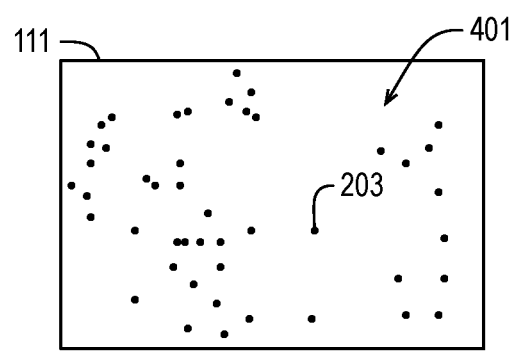
FIG. 4 illustrates example landmark feature points in an exemplary new frame.

FIG. 4 illustrates example landmark feature points 401 in an exemplary new frame 111, arranged in accordance with at least some implementations of the present disclosure. As shown in FIG. 4, new frame 111 may include any number of feature points 401 including feature point 203. Notably, the processing discussed with respect to feature point 203 and landmark 223 may be repeated for each of feature points 203 and their corresponding landmarks, estimated landmark positions, and estimated physical camera pose 215. For example, generating errors for the discussed mapping update may include determining a number of virtual camera poses, one for each of feature points 401, such that each of the virtual camera poses corresponds to one of the landmarks represented by feature points 401 within environment 200 and generating a number of errors, each one for the corresponding landmark using the techniques discussed herein. That is, processing discussed with respect to landmark 223 is repeated for each landmark having a new feature point detection in the current iteration to determined corresponding error. The errors are then used to update the mapping such that new estimated landmark positions are determined, one for each of the landmarks corresponding to landmark feature points 401.

Returning to FIG. 2, as discussed, an energy minimization problem, objective function, or the like having error terms based on estimated landmark position errors and estimated physical camera pose and/or pose error is critical to updating SLAM mappings based on the bundle adjustment formulation or other techniques. Advantageously, this formulation may be designed such that it is representative of low-noise observations to aid the optimization process to find more accurate estimates of camera pose and landmark locations.

As discussed, virtual camera pose 216 is adjusted adaptively per landmark 223 such that virtual camera pose 216 is parallel to image planes 211, 213 (e.g., in both the x and y directions) at a predetermined distance 232 from estimated physical camera pose 215. Furthermore, in some embodiments, only the error component along depth axis 218 is projected onto virtual image plane 213. Since virtual camera 202 may be located anywhere parallel to image plane 211, the projection error term of depth error projection 235 may include two elements capturing projection error in both x and y directions along image plane 211.

Modified estimated feature point position 224 may be generated using estimated physical camera pose 215, estimated feature point position 221, and estimated landmark position 222. In some embodiments, modified estimated feature point position 224 is determined as shown in Equation (1):

$$\vec{CD'} = [X_D, Y_D, Z_{D'}]^T = \|\vec{CD}\| \widehat{CM} \quad (1)$$

where $\vec{CD'}$ is modified estimated feature point position 224 relative to estimated physical camera pose 215 (which is provided as the origin) and is represented as a vector of $X_{D'}$, $Y_{D'}$, and $Z_{D'}$, and $\widehat{CM}$ is depth axis 218. As shown in Equation (1), modified estimated feature point position 224 is along depth axis 218, which extends from estimated physical camera pose 215 (C) to estimated landmark position 222 (M) and at a distance along depth axis 218 equal to the distance ($\|\vec{CD}\|$) from estimated physical camera pose 215 (C) to estimated feature point position 221 (D). In some embodiments, to account for error in generating modified estimated feature point position 224, modified estimated feature point position 224 may be within a volume that is centered at modified estimated feature point position 224 as provided in Equation (1) such that the volume has no surface more than 0.1 cm from modified estimated feature point position 224. Although discussed with respect to a volume having no surface more than 0.1 cm from modified estimated feature point position 224, any size or shape of volume may be used.

Next, 3D error 234 is identified as shown in Equation (2):

$$\vec{D'M} = \vec{CM} - \vec{CD'} \quad (2)$$

where $\vec{D'M}$ is 3D error 234, $\vec{CM}$ is estimated landmark position 222 (M), and $\vec{CD'}$ is modified estimated feature point position 224, as discussed with respect to Equation (1).

In some embodiments, to determine virtual camera pose 216 ($t_x$, $t_y$, 0), a projection or component of vector 237 parallel to image plane 211 is determined as shown in Equation (3):

$$\vec{DD'_{proj,\hat{n}_c}} = \vec{DD'} - (\vec{DD'} \cdot \hat{n}_c) \hat{n}_c \quad (3)$$

where $\vec{DD'_{proj,\hat{n}_c}}$ is the projection of vector 237 parallel to image plane 211, $\vec{DD'}$ is vector 237, and $\hat{n}_c$ is image plane 211.

The location of virtual camera 202 (e.g., virtual camera pose 216 with the same orientation of estimated physical camera pose 215) may then be determined as a location offset with respect to estimated physical camera pose 215 such that the location is parallel to image plane 211 (and the x-y plane), in a direction of the projection or component of vector 237 parallel to image plane 211, and at distance 232 as shown in Equation (4):

$$C' = [t_x, t_y, 0]^T = b \, \vec{DD'_{proj,\hat{n}_c}} \quad (4)$$

where C' is virtual camera pose 216 (e.g., the location of virtual camera pose 216), b is distance 232, and $\vec{DD'_{proj,\hat{n}_c}}$ is the projection of vector 237 parallel to image plane 211 as discussed with respect to Equation (3).

3D error 234, $\vec{D'M}$, between modified estimated feature point position 224 and estimated feature point position 221 (i.e., a virtual 3D error) is then projected onto virtual image plane 213 as discussed. Also as discussed estimated landmark position 222 is projected onto image plane 211. The projections onto virtual image plane 213 and image plane 211 are then used to provide an error, $e_{AVC}$, for landmark 223 based on estimated physical camera pose 215, estimated feature point position 221, and estimated landmark position 222 as shown in Equation (5):

$$e_{AVC} = \begin{bmatrix} x_M - x_D \\ y_M - y_D \\ \left(x_M - \frac{f_x t_x}{Z_M}\right) - \left(x_M - \frac{f_x t_x}{Z_{D'}}\right) \\ \left(y_M - \frac{f_y t_y}{Z_M}\right) - \left(y_M - \frac{f_y t_y}{Z_{D'}}\right) \end{bmatrix} = \begin{bmatrix} x_M - x_D \\ y_M - y_D \\ \left(\frac{f_x t_x}{Z_{D'}} - \frac{f_x t_x}{Z_M}\right) \\ \left(\frac{f_y t_y}{Z_{D'}} - \frac{f_y t_y}{Z_M}\right) \end{bmatrix} \quad (5)$$

where $e_{AVC}$ is the error, $x_M - x_D$ is a planar horizontal component error, $y_M - y_D$ is a planar vertical component error, $$\left(\frac{f_x t_x}{Z_{D'}} - \frac{f_x t_x}{Z_M}\right)$$

is a depth horizontal component error, and $$\left(\frac{f_y t_y}{Z_{D'}} - \frac{f_y t_y}{Z_M}\right)$$

is a depth vertical component error. Notably, the depth horizontal component error and the depth vertical component error are the horizontal and vertical components of $u_M - u_{D'}$, respectively. Furthermore, in Equation (5), ($f_x$, $f_y$) refer to the focal lengths of physical camera 201, and $Z_M$ and $Z_{D'}$ are distances to estimated landmark position 222 and modified estimated feature point position 224, respectively, as used for image plane projection as is known in the art.

The error, $e_{AVC}$, may then be used, along with other error terms and cues to provide a new estimated physical camera pose and landmark positions within a mapping of environment 200. For example, a least-squares error formulation based on such errors may be solved for the camera pose and landmark positions. As discussed, in some embodiments, the error, $e_{AVC}$, may include a term corresponding to a horizontal projected error component of the projected 3D error component (e.g., the third term of the vector) and a term corresponding to a vertical projected error component of the projected 3D error component (e.g., the fourth term of the vector). In some embodiments, a normalization of such terms may be determined such that a single term including a normalization of the term corresponding to a horizontal projected error component of the projected 3D error component and the term corresponding to a vertical projected error component of the projected 3D error component is used in error $e_{AVC}$. In such embodiments, the error, $e_{AVC}$, then includes a vector of three terms. The normalization may be any suitable normalization such as a level one norm (L1 norm) or a level two norm (L2 norm) with implementation of a L2 norm being particularly advantageous.

Notably, a virtual 3D error, $\vec{D'M}$, is projected onto virtual image plane 213 as a part of the error, $e_{AVC}$. Since vector 237, $\vec{D'M}$, is collinear with estimated physical camera pose 215 and estimated landmark position 222, the only viewpoint from which the projection of vector 237 would be zero is if it were on the line joining estimated physical camera pose 215 (C), modified estimated feature point position 224 (D'), and estimated landmark position 222 (M). Since the locus of virtual camera pose 216 (C') is on a circle of non-zero magnitude b (distance 232) away from estimated physical camera pose 215 (C), this provides a guarantee that if $\|\overrightarrow{DM'}\|\neq 0$ then the projection of vector 237 will always be non-zero on virtual image plane 213.

Figure 5:
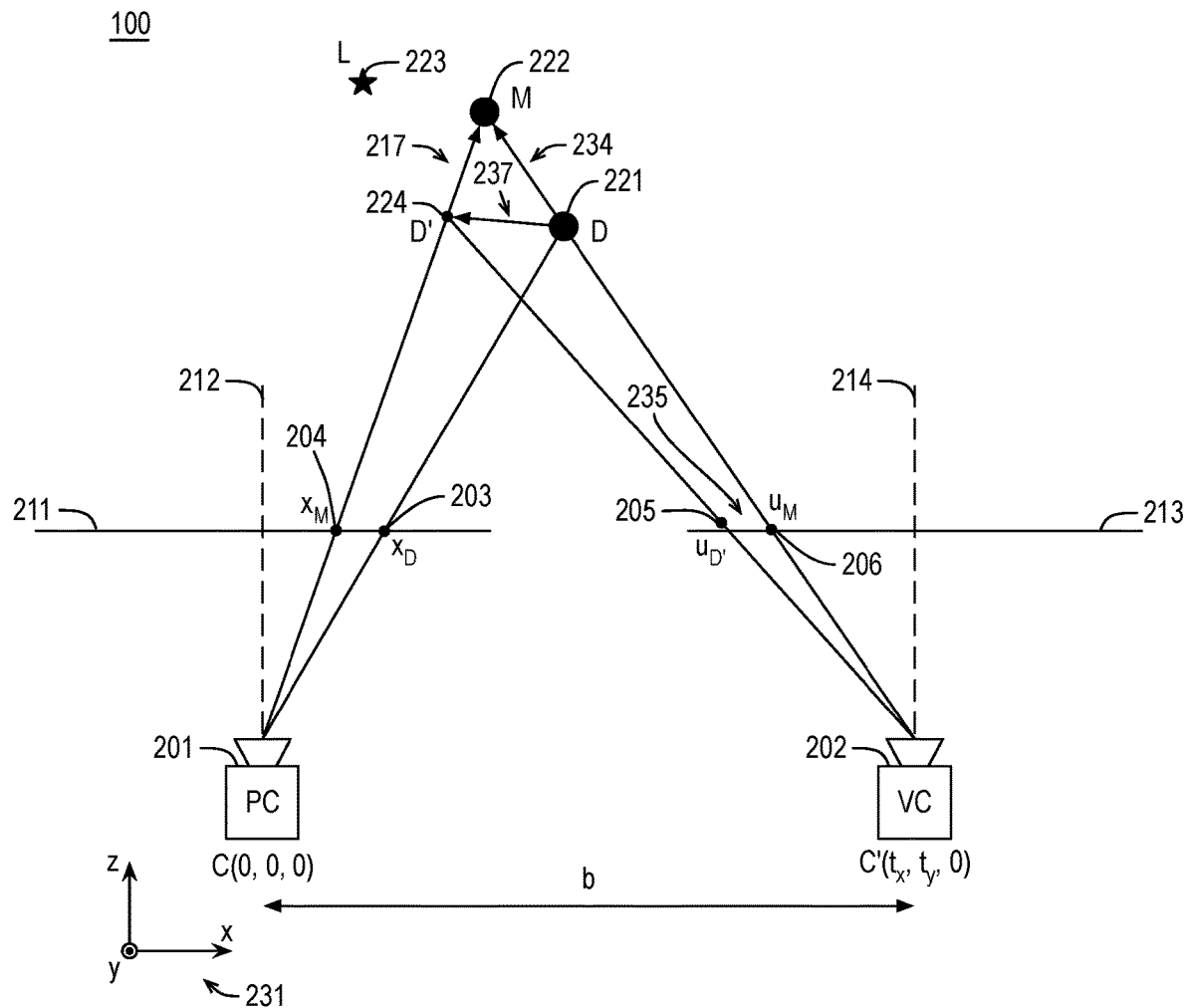
FIG. 5 illustrates another geometry of exemplary estimated physical camera pose, estimated landmark position, and estimated feature point position.

FIG. 5 illustrates another geometry of exemplary estimated physical camera pose 215, estimated landmark position 222, and estimated feature point position 221, arranged in accordance with at least some implementations of the present disclosure. As shown in FIG. 5, when estimated feature point position 221 is along a line extending from estimated landmark position 222 to virtual camera pose 216 (in at least one dimension), the projection of vector 237 onto virtual image plane 213 as discussed herein provides depth error projection 235 corresponding to 3D error 217. Notably, if 3D error 234 were projected onto virtual image plane 213, no depth component would be captured in the error.

Figure 6:
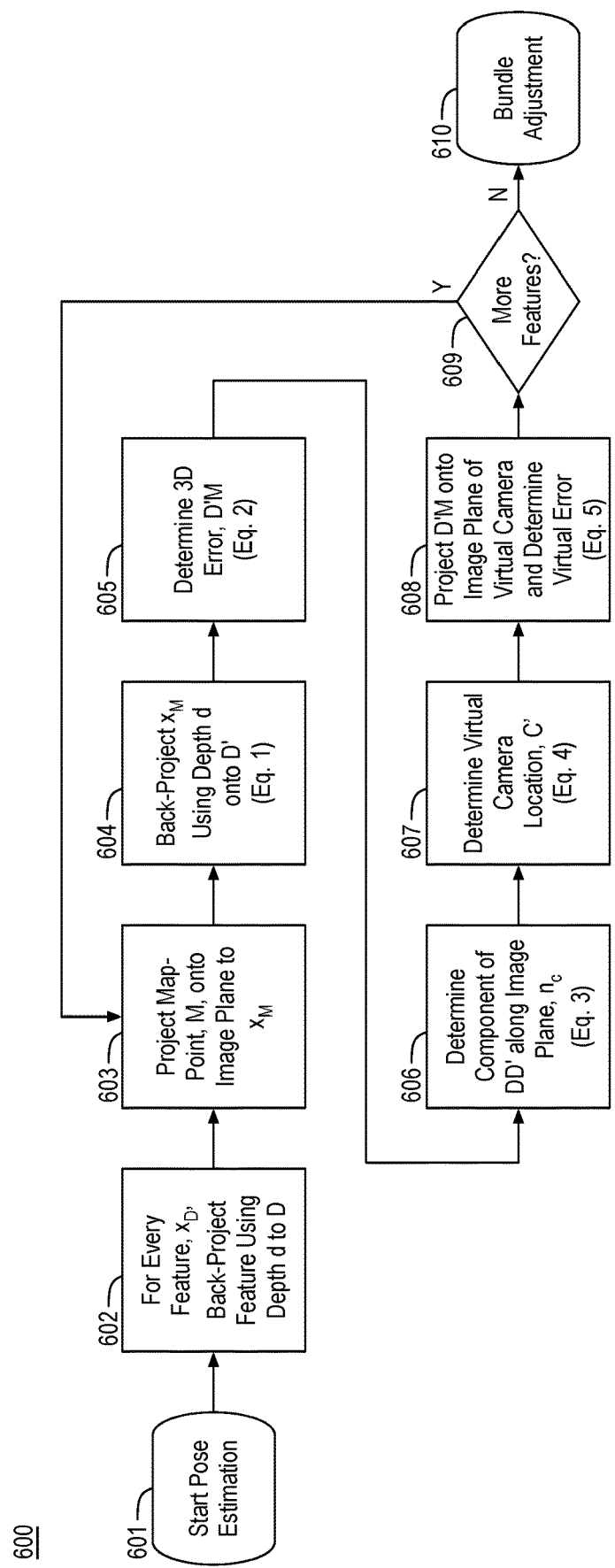
FIG. 6 is a flow diagram illustrating an example process for performing simultaneous localization and mapping.

FIG. 6 is a flow diagram illustrating an example process 600 for performing simultaneous localization and mapping, arranged in accordance with at least some implementations of the present disclosure. Process 600 may include one or more operations 601-610 as illustrated in FIG. 6. Process 600 may form at least part of a simultaneous localization and mapping (SLAM).

By way of non-limiting example, process 600 may form at least part of a SLAM process by system 100 as discussed herein.

Processing begins at start operation 601, where pose estimation is initiated. For example, prior to process a prior iteration for an environment or an initiation of the environment may have been performed. Therefore, process 600 may begin with a map or mapping including an estimated physical camera pose (C) and any number of estimated landmark positions (M) for landmarks (L) within the environment. Furthermore, at operation 601, a current frame of the environment is attained (e.g., by the physical camera) and feature extraction is performed on the frame to identify features ($x_D$) within the frame and to associated them with landmarks in the mapping. Thereby, at operation 601, an estimated physical camera pose (C), any number of estimated landmark positions (M), and feature locations or feature points ($x_D$) within a current frame for features corresponding to the landmarks (L) are attained.

Processing continues at operation 602, where, for each feature point in the frame ($x_D$), back-projection is performed to locate the feature at a 3D position within the environment. Such back-projection may be performed using any suitable technique or techniques. For example, for each feature point ($x_D$), an estimated feature point position (D) within the environment is attained. As discussed, in some embodiments, the estimated physical camera pose (C) may provide an origin (0, 0, 0) and a baseline orientation for a coordinate system within the environment. In such embodiments, each estimated feature point position (D) may be relative to the estimated physical camera pose (C).

Processing continues at operation 603, where an estimated landmark position (M) or map-point is projected onto the image plane of the physical camera to provide a projected point ($x_M$) corresponding to the landmark. Such projection may be performed using any suitable technique or techniques. Notably, each of the projected point ($x_M$) from the estimated landmark position (M), the estimated landmark position (M), the feature point in the frame ($x_D$), and the estimated feature point position (D) all correspond to the same landmark (L).

Processing continues at operation 604, where the feature point in the frame ($x_D$), is back-projected using distance (d) onto a modified estimated feature point position (D') as discussed with respect to Equation (1). For example, the modified estimated feature point position (D') may be on a line extending from the estimated physical camera pose (C) to the estimated landmark position (M) and at a distance (d) equal to the distance from the estimated physical camera pose (C) to the estimated feature point position (D).

Processing continues at operation 605, where a 3D error (D'M) between the modified estimated feature point position (D') and the estimated landmark position (M) is determined as discussed with respect to Equation (2). Notably, the 3D error (D'M) indicates an error in 3D space along a depth axis (CM) corresponding to the landmark (L). Subsequent to locating a virtual camera pose (C'), the 3D error (D'M) is then projected onto a virtual image plane of the virtual camera such that the 3D error (D'M) is maintained in any geometry corresponding to estimated physical camera pose (C), estimated landmark positions (M), and estimated feature point position (D).

Processing continues at operation 606, where the component of a vector (DD') from the estimated feature point position (D) to the modified estimated feature point position (D') projected onto the image plane ($n_c$) of the physical camera is determined as discussed with respect to Equation (3). Notably, the component determined at operation 606 is the direction of vector (DD') along or projected onto the image plane ($n_c$). The virtual camera pose (C') may then be determined at a location in the same direction as the component along or projected onto the image plane ($n_c$) from the estimated physical camera pose (C). That is, the virtual camera pose (C') is at a location moved from the estimated physical camera pose (C) parallel to the image plane ($n_c$) and in the direction of vector (DD') along or projected onto the image plane ($n_c$).

Processing continues at operation 607, where the virtual camera pose (C') is determined using the component of vector (DD') along or projected onto the image plane ($n_c$) and a predetermined baseline camera separation distance (b) as discussed with respect to Equation (4). The predetermined baseline camera separation distance (b) may be any suitable value such as a value of about 1.5 cm to 15 cm. In some embodiments, the predetermined baseline camera separation distance (b) is the same distance of a distance between the physical camera and a second physical camera used to generate depth data of the environment or a distance between an IR transmitter and an IR sensor used to generate depth of the environment. The IR sensor may be a dedicated IR camera, an RGB camera without an IR filter, or the physical camera itself in various implementations. As discussed, the virtual camera pose (C') is at a location from the estimated physical camera pose (C) in a direction of the component of vector (DD') along or projected onto the image plane ($n_c$) and at a distance from the physical camera pose (C) of the predetermined baseline camera separation distance (b).

Processing continues at operation 608, where the 3D error (D'M) between the modified estimated feature point position (D') and the estimated landmark position (M) as discussed with respect to operation 605 is projected onto the image plane of the virtual camera and the virtual error is determined. As discussed, in some embodiments, the virtual camera is modeled as having the same features (e.g., focal length, image size and resolution, etc.) as the physical camera. In some embodiments, such features may be modified. In some embodiments, the image plane of the virtual camera is the same plane as the physical camera while in other embodiments, the image planes are different but parallel.

In either case, the 3D error (D'M) is projected onto the image plane of the virtual camera as discussed with respect to Equation (5) by projecting both the modified estimated feature point position (D') and the estimated landmark positions (M) onto the image plane of the virtual camera to a modified estimated feature point projected point ($u_{D'}$) and a estimated landmark position projected point ($u_M$), respectively. For example, the modified estimated feature point projected point ($u_{D'}$) horizontal or x-axis position may be the x-axis focal length of the cameras ($f_x$) multiplied by the horizontal or x-axis offset of the virtual camera pose ($t_x$) divided by the depth of the modified estimated feature point position ($Z_{D'}$) such that the modified estimated feature point projected point is $$\frac{f_x t_x}{Z_{D'}}.$$

The vertical or y-axis position of the modified estimated feature point projected point ($u_{D'}$), the horizontal or x-axis position of the estimated landmark position projected point ($u_M$), and the vertical or y-axis position of the estimated landmark position projected point ($u_M$) may be determined using analogous techniques as provided in Equation (5).

The virtual error or a projected 3D error component ($u_{D'} - u_M$) may then be determined in both the horizontal or x-axis and in the vertical or y-axis as provided in Equation (5). For example, the horizontal or x-axis projected 3D error component is provided as the third term in the error vector and the vertical or y-axis projected 3D error component is provided as the fourth term in the error vector. Furthermore, the error includes a term (the first term in Equation (5)) corresponding to a horizontal error between a projection ($x_D$) of the estimated feature point position (D) on an image plane of the physical camera and a projection ($x_M$) of the estimated landmark position (M) on the image plane of the physical camera and a fourth term corresponding to a vertical error between the projection ($y_D$) of the estimated feature point position (D) on the camera plane of the physical camera and the projection ($y_M$) of the estimated landmark position (M) on the camera plane of the physical camera.

In some embodiments, the error used to update the mapping of the environment includes each of the four terms: the horizontal and the vertical errors on the image plane corresponding to the physical camera pose and the horizontal and vertical errors of the projected 3D virtual error on the image plane corresponding to the virtual camera pose. In some embodiments, the error used to update the mapping of the environment includes each of the three terms: the horizontal and the vertical errors on the image plane corresponding to the physical camera pose and a normalization of the horizontal and vertical errors of the projected 3D virtual error on the image plane corresponding to the virtual camera pose (e.g., a L2 norm). In any event, the error includes the projected 3D error component.

Processing continues at decision operation 609, where a determination is made as to whether the feature processed with respect to operations 603-608 is the last detected feature. If not, processing continues at operations 603-608 as discussed above until each feature is processed. Notably, a new virtual camera pose (C') is determined for each feature (and therefore each landmark) being processed. If so, processing continues at operation 610, where the generated errors (one each for each landmark) are used in a bundle adjustment process (or other process) to provide a new mapping for the environment such that the new mapping is responsive to the errors and provides at least one of a new estimated physical camera pose (C) or one or more new estimated landmark positions (M). Process 600 may be repeated for each or some new frames received for the environment as discussed herein. Furthermore, the new mapping may be further refined, analyzed, or even discarded using techniques known in the art.

The techniques discussed herein provide an improved error depth term (e.g., as provided in Equation (5)) having a high correlation with respect to the depth error component of the 3D error between an estimated feature point position (D) and an estimated landmark position (M) in a wide range of geometries by adaptively locating a virtual camera pose (C') and projection of a virtual 3D error (D'M) onto the image plane corresponding to the virtual camera pose (C'). Such techniques may be contrasted with locating a virtual camera at a fixed location with respect to an estimated physical camera pose, which have failure cases that do not maintain the depth error component in conditions where the estimated feature point position is collinear with the estimated landmark position and the fixed virtual camera pose and similar geometries.

The disclosed techniques decouple the axial depth error from the 3D geometric error by projecting a new error vector. With reference to FIG. 2, modified estimated feature point position 224 (D') is determined by back-projecting the depth (d) of estimated feature point position 221 (D) along the direction of the vector from estimated physical camera pose 215 (C) (e.g., an original camera position to estimated landmark position 222 (M) (e.g., a map-point). The virtual error, 3D error 234 (D'), is projected onto virtual image plane 213 of virtual camera 202. Thereby, the error component is projected along depth axis 218. An adaptive location of virtual camera 202 (virtual camera pose 216) is dynamically adjusted according to 3D error 234. Thereby, it is ensured that virtual camera pose 216 (e.g., the position of virtual camera 202) is adjusted adaptively per landmark 223 parallel to image plane 211 (e.g., in both the x and y directions) at a constant baseline distance 232 (b) from estimated physical camera pose 215. Virtual camera pose 216 (e.g., the position of virtual camera 202) is determined by the projection of vector 237 (DD') on virtual image plane 213 (e.g., a camera plane) thereby determining the direction in which the virtual camera 202 needs to be moved at distance 232 from estimated physical camera pose 215. Adaptive virtual camera 202 estimates virtual error components on both x and y directions as virtual camera 202 may be moved in both x and y directions parallel to image plane 211 (e.g., a camera plane). Thereby, improved simultaneous localization and mapping is provided. Such improvements may be provided by providing an error (e.g., as provided in Equation (5)) that is highly correlated with z-normalized depth error and is mutually exclusive of projection errors, by providing a guarantee that a non-zero 3D depth error results in a non-zero error projection, by eliminating bias of the virtual camera error towards a particular error vector, and providing an optimization process that is largely invariant to the distance offset of the virtual camera.

Figure 7:
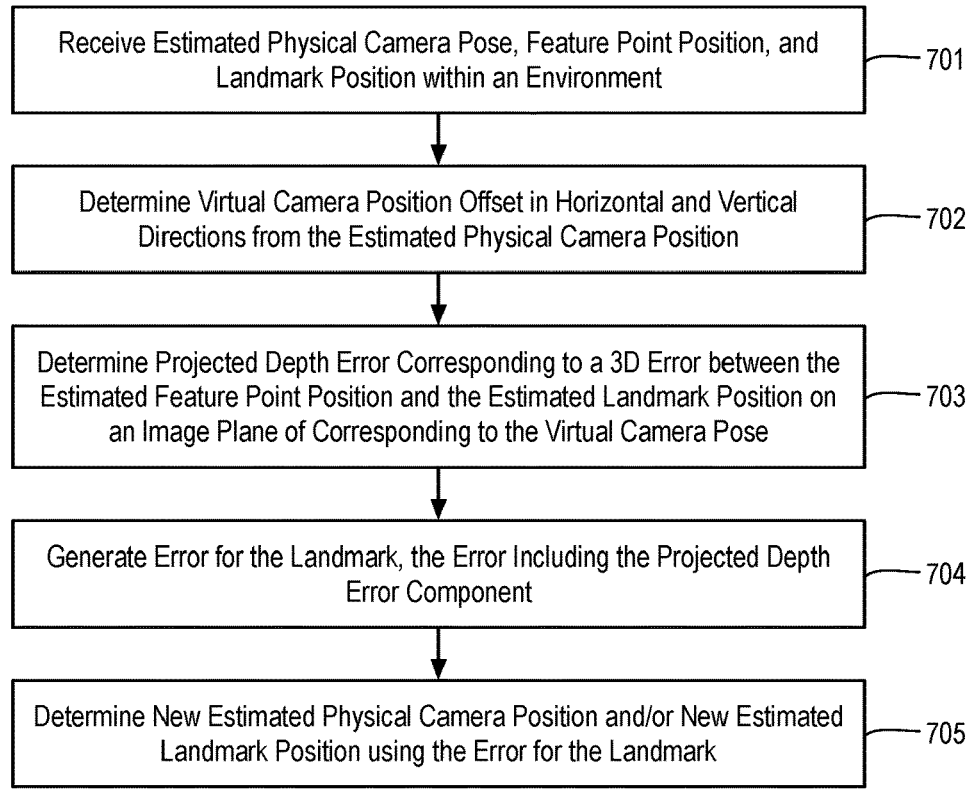
FIG. 7 is a flow diagram illustrating an example process for performing simultaneous localization and mapping of an environment.

FIG. 7 is a flow diagram illustrating an example process 700 for performing simultaneous localization and mapping of an environment, arranged in accordance with at least some implementations of the present disclosure. Process 700 may include one or more operations 701-705 as illustrated in FIG. 7. Process 700 may form at least part of a simultaneous localization and mapping (SLAM) process. By way of non-limiting example, process 700 may form at least part of a SLAM process performed by system 100 as discussed herein. Furthermore, process 700 will be described herein with reference to system 800 of FIG. 8.

Figure 8:
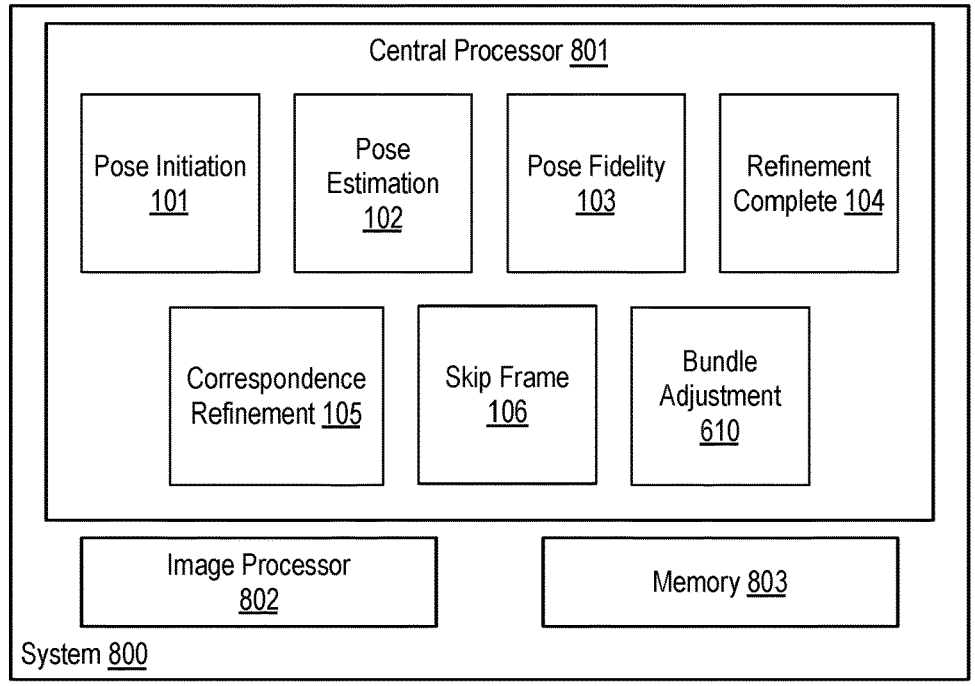
FIG. 8 is an illustrative diagram of an example system for performing simultaneous localization and mapping of an environment.

FIG. 8 is an illustrative diagram of an example system 800 for performing simultaneous localization and mapping of an environment, arranged in accordance with at least some implementations of the present disclosure. As shown in FIG. 8, system 800 may include a central processor 801, an image processor 802, and a memory 803. Also as shown, central processor 801 may include or implement pose initiation module 101, pose estimation module 102, pose fidelity module 103, refinement completion module 104, correspondence refinement module 105, and skip frame module 106. Such components or modules may be implemented to perform operations as discussed herein.

Memory 803 may store frames, environment mapping data, physical camera pose estimation data, virtual camera pose data, camera parameters, landmark position and projection data, feature position and projection data, modified feature position and projection data, and any other data discussed herein. As shown, in some examples, pose initiation module 101, pose estimation module 102, pose fidelity module 103, refinement completion module 104, correspondence refinement module 105, skip frame module 106, and bundle adjustment module 610 (to implement operation 610 as discussed above) are implemented via central processor 801. In other examples, one or more or portions of pose initiation module 101, pose estimation module 102, pose fidelity module 103, refinement completion module 104, correspondence refinement module 105, skip frame module 106, and bundle adjustment module 610 are implemented via image processor 801, a video processor, a graphics processor, or the like. In yet other examples, one or more or portions of pose initiation module 101, pose estimation module 102, pose fidelity module 103, refinement completion module 104, correspondence refinement module 105, skip frame module 106, and bundle adjustment module 610 are implemented via an image or video processing pipeline or unit.

Image processor 802 may include any number and type of graphics, image, or video processing units that may provide the operations as discussed herein. In some examples, image processor 802 may be an image signal processor. Such operations may be implemented via software or hardware or a combination thereof. For example, image processor 802 may include circuitry dedicated to manipulate image data or video data obtained from memory 803. Central processor 801 may include any number and type of processing units or modules that may provide control and other high level functions for system 800 and/or provide any operations as discussed herein. Memory 803 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 803 may be implemented by cache memory.

In an embodiment, one or more or portions of pose initiation module 101, pose estimation module 102, pose fidelity module 103, refinement completion module 104, correspondence refinement module 105, skip frame module 106, and bundle adjustment module 610 are implemented via an execution unit (EU) of image processor 802. The EU may include, for example, programmable logic or circuitry such as a logic core or cores that may provide a wide array of programmable logic functions. In an embodiment, one or more or portions of pose initiation module 101, pose estimation module 102, pose fidelity module 103, refinement completion module 104, correspondence refinement module 105, skip frame module 106, and bundle adjustment module 610 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of pose initiation module 101, pose estimation module 102, pose fidelity module 103, refinement completion module 104, correspondence refinement module 105, skip frame module 106, and bundle adjustment module 610 are implemented via an application specific integrated circuit (ASIC). The ASIC may include an integrated circuitry customized to perform the operations discussed herein.

Returning to discussion of FIG. 7, process 700 begins at operation 701, where an estimated physical camera pose for a physical camera within an environment, an estimated feature point position within the environment, and an estimated landmark position for a landmark within the environment are received or generated such that the estimated feature point position and the estimated landmark position both correspond to the landmark. For example, the estimated physical camera pose and the estimated landmark position may be from a previous iteration of updating a mapping of the environment and the estimated feature point position may be a back-propagation from a detected feature point. In some embodiments, the estimated physical camera pose, the estimated feature point position, and the estimated landmark position each include a 3D position within a 3D coordinate system defined within the environment. In some embodiments, the estimated feature point position is a position back projected from a detected feature point within an image captured by the physical camera.

Processing continues at operation 702, where, based on the estimated physical camera pose, the estimated feature point position, and the estimated landmark position, a virtual camera pose is determined within the environment such that the virtual camera pose is offset in both a horizontal direction and a vertical direction with respect to the estimated physical camera pose. In some embodiments, determining the virtual camera pose includes determining a modified estimated feature point position for the estimated feature point position such that the modified estimated feature point position is along a depth axis extending from the estimated physical camera pose to the estimated landmark position and at a distance along the depth axis equal to a distance from the estimated physical camera pose to the estimated feature point position and generating the virtual camera pose at a position from the estimated physical camera pose that is aligned with a projection of a vector from the estimated feature point position to the modified estimated feature point to the image plane and at a predetermined distance from the physical camera pose. In some embodiments, the predetermined distance is a distance between the physical camera and a second physical camera such that the estimated feature point position is based on stereoscopic techniques using images attained using physical camera and the second physical camera.

In some embodiments, determining the virtual camera pose includes determining a modified estimated feature point position for the estimated feature point position such that the modified estimated feature point position is within a volume that is centered along a depth axis extending from the estimated physical camera pose to the estimated landmark position and that is centered at a distance along the depth axis equal to a distance from the estimated physical camera pose to the estimated feature point position such that the volume has no surface more than 0.1 cm from the center and generating the virtual camera pose at a position from the physical camera pose that is aligned with a projection from the estimated feature point position to the modified estimated feature point to the image plane and at a predetermined distance from the physical camera pose.

Processing continues at operation 703, where a projected depth error corresponding to a 3D error between the estimated feature point position and the estimated landmark position on an image plane corresponding to the virtual camera pose is determined. The projected depth error may be projected using any suitable technique or techniques. In some embodiments, determining the projected depth error includes projecting a modified estimated feature point position for the estimated feature point position to a first projected point on the image plane, projecting the estimated landmark position to a second projected point on the image plane, and differencing the first and second projected points. In some embodiments, the modified estimated feature point position is along a depth axis extending from the estimated physical camera pose to the estimated landmark position and at a distance along the depth axis equal to a distance from the estimated physical camera pose to the estimated feature point position.

Processing continues at operation 704, where an error is generated corresponding to the landmark such that the error includes the projected depth error. The error may have any suitable format and may include the projected depth error, for example, as one or more terms thereof. In some embodiments, the error includes a first term corresponding to a horizontal projected error component of the projected 3D error component and a second term corresponding to a vertical projected error component of the projected 3D error component. In some embodiments, the error includes a third term corresponding to a horizontal error between a projection of the estimated feature point position on an image plane of the physical camera and a projection of the estimated landmark position on the image plane of the physical camera and a fourth term corresponding to a vertical error between the projection of the estimated feature point position on the camera plane of the physical camera and the projection of the estimated landmark position on the camera plane of the physical camera. In some embodiments, the error includes a norm of a horizontal projected depth error component of the projected depth error component and a vertical projected depth error component of the projected depth error component.

Processing continues at operation 705, where at least of one of a new estimated physical camera pose or a new estimated landmark position using the error corresponding to the landmark. The new estimated physical camera pose or new estimated landmark position may be determine using any suitable technique or techniques. In some embodiments, determining the new estimated physical camera pose or new estimated landmark position includes determining the new estimated physical camera pose or new estimated landmark position, or both, based on a bundle adjustment using the error corresponding to the landmark.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a multi-function device or a computing system such as, for example, a laptop computer, a tablet, or a smart phone. Those skilled in the art may recognize that systems described herein may include additional components that have not been depicted in the corresponding figures. For example, the systems discussed herein may include additional components such as image pre-processing circuitry, memory controllers, or the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any operation discussed herein or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 9:
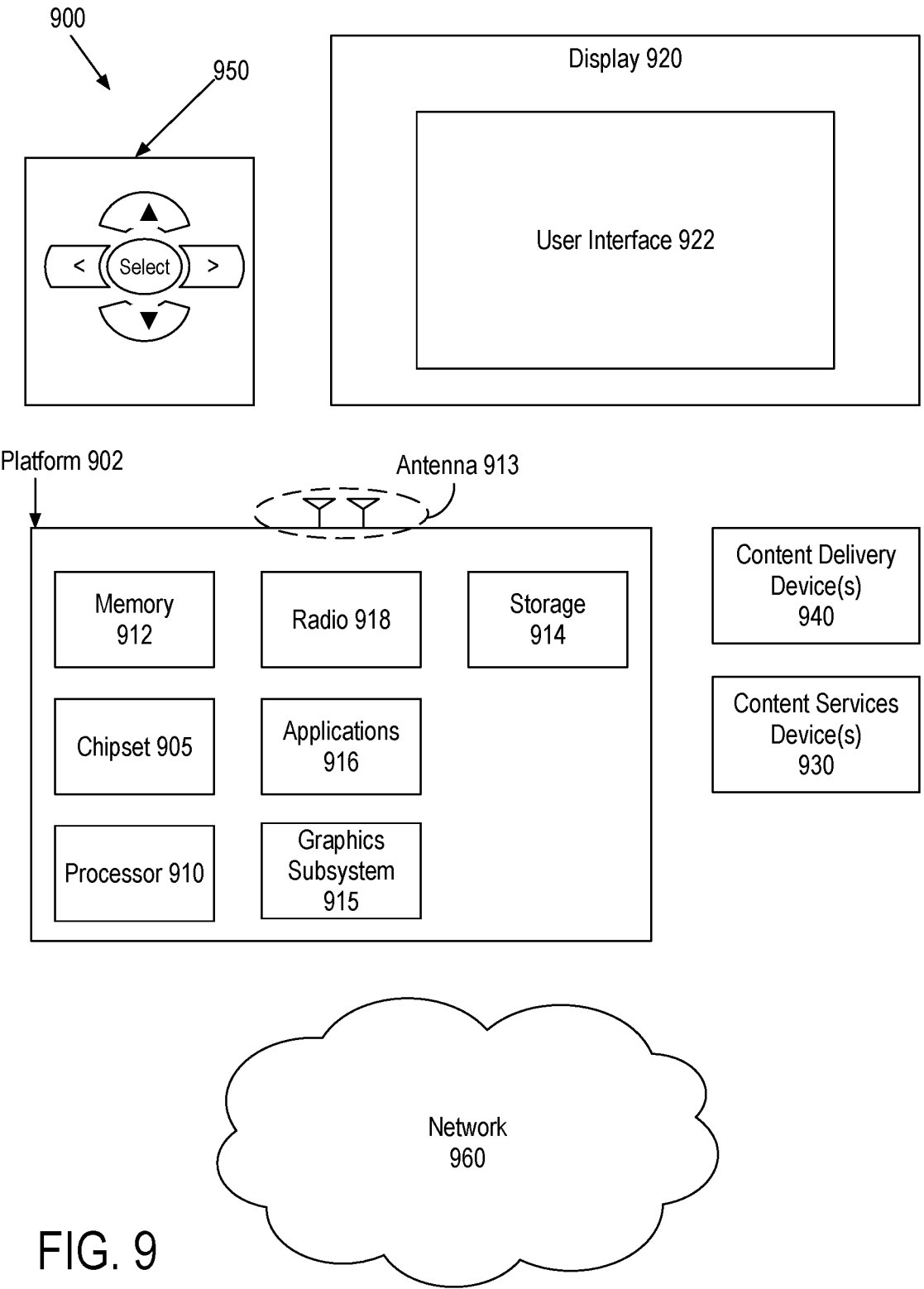
FIG. 9 is an illustrative diagram of an example system.

FIG. 9 is an illustrative diagram of an example system 900, arranged in accordance with at least some implementations of the present disclosure. In various implementations, system 900 may be a computing system although system 900 is not limited to this context. For example, system 900 may be incorporated into a personal computer (PC), laptop computer, ultra-laptop computer, tablet, phablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, peripheral device, gaming console, wearable device, display device, all-in-one device, two-in-one device, and so forth.

In various implementations, system 900 includes a platform 902 coupled to a display 920. Platform 902 may receive content from a content device such as content services device(s) 930 or content delivery device(s) 940 or other similar content sources such as a camera or camera module or the like. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, antenna 913, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still images, graphics, or video for display. Graphics subsystem 915 may be a graphics processing unit (GPU), a visual processing unit (VPU), or an image processing unit, for example. In some examples, graphics subsystem 915 may perform scanned image rendering as discussed herein. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 may be integrated into processor 910 or chipset 905. In some implementations, graphics subsystem 915 may be a stand-alone device communicatively coupled to chipset 905.

The image processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further embodiments, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any flat panel monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of uni-directionally or bi-directionally communicating content between content providers and platform 902 and/display 920, via network 960 or directly. It will be appreciated that the content may be communicated uni-directionally and/or bi-directionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of navigation controller 950 may be used to interact with user interface 922, for example. In various embodiments, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 950 may be replicated on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In various embodiments, navigation controller 950 may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 5.1 surround sound audio and/or high definition 9.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
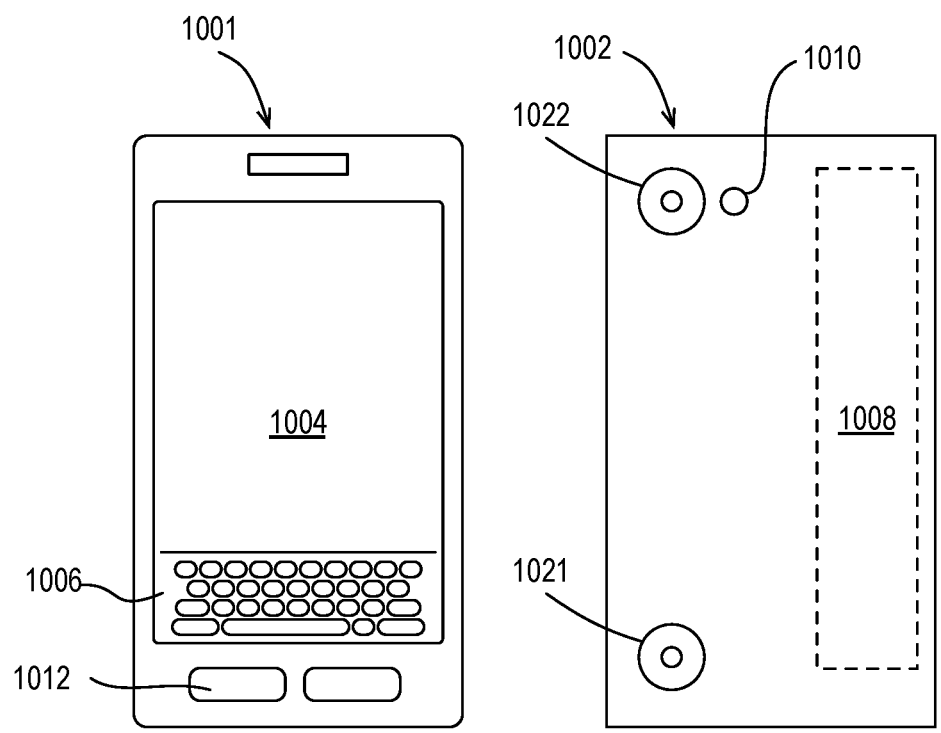
FIG. 10 illustrates an example small form factor device, all arranged in accordance with at least some implementations of the present disclosure.

As described above, system 900 may be embodied in varying physical styles or form factors. FIG. 10 illustrates an example small form factor device 1000, arranged in accordance with at least some implementations of the present disclosure. In some examples, system 900 may be implemented via device 1000. In other examples, other systems, components, or modules discussed herein or portions thereof may be implemented via device 1000. In various embodiments, for example, device 1000 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 10, device 1000 may include a housing with a front 1001 and a back 1002. Device 1000 includes a display 1004, an input/output (I/O) device 1006, a color camera 1021, a color camera 1022, and an integrated antenna 1008. For example, color camera 1021 and color camera 1022 and may input image data (e.g., left and right images) as discussed herein. Device 1000 also may include navigation features 1012. I/O device 1006 may include any suitable I/O device for entering information into a mobile computing device. Examples for I/O device 1006 may include an alphanumeric keyboard, a numeric keypad, a touch pad, input keys, buttons, switches, microphones, speakers, voice recognition device and software, and so forth. Information also may be entered into device 1000 by way of microphone (not shown), or may be digitized by a voice recognition device. As shown, device 1000 may include color cameras 1021, 1022, and a flash 1010 integrated into back 1002 (or elsewhere) of device 1000. In other examples, color cameras 1021, 1022, and flash 1010 may be integrated into front 1001 of device 1000 or both front and back sets of cameras may be provided. Color cameras 1021, 1022 and a flash 1010 may be components of a camera module to originate color image data that may be processed into an image or streaming video that is output to display 1004 and/or communicated remotely from device 1000 via antenna 1008 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for performing simultaneous localization and mapping comprises receiving an estimated physical camera pose for a physical camera within an environment, an estimated feature point position within the environment, and an estimated landmark position for a landmark within the environment, wherein the estimated feature point position and the estimated landmark position both correspond to the landmark, determining, based on the estimated physical camera pose, the estimated feature point position, and the estimated landmark position, a virtual camera pose within the environment, wherein the virtual camera pose is offset in both a horizontal direction and a vertical direction with respect to the estimated physical camera pose, determining a projected depth error corresponding to a 3D error between the estimated feature point position and the estimated landmark position on an image plane corresponding to the virtual camera pose, generating an error corresponding to the landmark, the error comprising the projected depth error, and determining at least of one of a new estimated physical camera pose or a new estimated landmark position using the error corresponding to the landmark.

In one or more second embodiments, further to the first embodiments, determining the virtual camera pose comprises determining a modified estimated feature point position for the estimated feature point position, wherein the modified estimated feature point position is along a depth axis extending from the estimated physical camera pose to the estimated landmark position and at a distance along the depth axis equal to a distance from the estimated physical camera pose to the estimated feature point position and generating the virtual camera pose at a position from the estimated physical camera pose that is aligned with a projection of a vector from the estimated feature point position to the modified estimated feature point to the image plane and at a predetermined distance from the physical camera pose.

In one or more third embodiments, further to the first or second embodiments, the predetermined distance comprises a distance between the physical camera and a second physical camera, wherein the estimated feature point position is based on stereoscopic techniques using images attained using physical camera and the second physical camera.

In one or more fourth embodiments, further to any of the first through third embodiments, the method further comprises determining a plurality of second virtual camera poses within the environment, each of the second virtual camera poses corresponding to one of a plurality of second landmarks within the environment, generating a plurality of second errors each corresponding to one of the second landmarks and comprising a projected depth error corresponding to one of the second landmarks, and determining new second estimated landmark positions for each of the second landmarks using the error and the second errors.

In one or more fifth embodiments, further to any of the first through fourth embodiments, determining the projected depth error comprises projecting a modified estimated feature point position for the estimated feature point position to a first projected point on the image plane, projecting the estimated landmark position to a second projected point on the image plane, and differencing the first and second projected points.

In one or more sixth embodiments, further to any of the first through fifth embodiments, the modified estimated feature point position is along a depth axis extending from the estimated physical camera pose to the estimated landmark position and at a distance along the depth axis equal to a distance from the estimated physical camera pose to the estimated feature point position.

In one or more seventh embodiments, further to any of the first through sixth embodiments, the error comprises a first term corresponding to a horizontal projected error component of the projected 3D error component and a second term corresponding to a vertical projected error component of the projected 3D error component on the image plane of the virtual camera.

In one or more eighth embodiments, further to any of the first through seventh embodiments, the error further comprises a third term corresponding to a horizontal error between a projection of the estimated feature point position on an image plane of the physical camera and a projection of the estimated landmark position on the image plane of the physical camera and a fourth term corresponding to a vertical error between the projection of the estimated feature point position on the camera plane of the physical camera and the projection of the estimated landmark position on the camera plane of the physical camera.

In one or more ninth embodiments, further to any of the first through eighth embodiments, the error comprises a norm of a horizontal projected depth error component of the projected depth error component and a vertical projected depth error component of the projected depth error component.

In one or more tenth embodiments, further to any of the first through ninth embodiments, the estimated physical camera pose, the estimated feature point position, and the estimated landmark position each comprises a 3D position within a 3D coordinate system defined within the environment, and wherein the estimated feature point position is a position back projected from a detected feature point within an image captured by the physical camera.

In one or more eleventh embodiments, a device or system includes a memory and one or more processors to perform a method according to any one of the above embodiments.

In one or more twelfth embodiments, at least one non-transitory machine readable medium includes a plurality of instructions that in response to being executed on a computing device, cause the computing device to perform a method according to any one of the above embodiments.

In one or more thirteenth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for simultaneous localization and mapping comprising:
    a memory to store an estimated physical camera pose for a camera within an environment, an estimated landmark position for a landmark within the environment, and an estimated feature point position for the landmark; and
    one or more processors coupled to the memory, the one or more processors to:
        determine, based on the estimated physical camera pose, the estimated feature point position, and the estimated landmark position, a virtual camera pose within the environment, wherein the virtual camera pose is offset in a horizontal and a vertical direction with respect to the estimated physical camera pose;
        determine a projected depth error corresponding to a 3D error between the estimated feature point position and the estimated landmark position on an image plane corresponding to the virtual camera pose;
        generate an error corresponding to the landmark, the error comprising the projected depth error; and
        determine at least one of a new estimated physical camera pose or a new estimated landmark position using the error corresponding to the landmark.

2. The system of claim 1, the one or more processors further to:
    determine a plurality of second virtual camera poses within the environment, each of the plurality of second virtual camera poses corresponding to one of a plurality of second landmarks within the environment;
    generate a plurality of second errors each comprising a projected depth error corresponding to one of the second landmarks; and
    determine new second estimated landmark positions for each of the second landmarks using the error and the second errors.

3. The system of claim 1, wherein the error comprises a norm of a horizontal projected depth error component of the projected depth error component and a vertical projected depth error component of the projected depth error component.

4. The system of claim 1, wherein the estimated physical camera pose, the estimated feature point position, and the estimated landmark position each comprises a 3D position within a 3D coordinate system defined within the environment, and wherein the estimated feature point position is a position back projected from a detected feature point within an image captured by the camera.

5. The system of claim 1, wherein the one or more processors to determine the virtual camera pose comprises the one or more processors to:
    determine a modified estimated feature point position for the estimated feature point position, wherein the modified estimated feature point position is along a depth axis extending from the estimated physical camera pose to the estimated landmark position and at a distance along the depth axis corresponding to a distance from the estimated physical camera pose to the estimated feature point position; and
    generate the virtual camera pose at a position from the estimated physical camera pose that is aligned with a projection of a vector from the estimated feature point position to the modified estimated feature point position to the image plane and at a predetermined distance from the physical camera pose.

6. The system of claim 5, wherein the predetermined distance comprises a distance between the camera and a second camera, wherein the estimated feature point position is based on stereoscopic techniques using images attained using the camera and the second camera.

7. The system of claim 1, wherein the one or more processors to determine the projected depth error comprises the one or more processors to:
    project a modified estimated feature point position for the estimated feature point position to a first projected point on the image plane of the virtual camera;
    project the estimated landmark position to a second projected point on the image plane; and
    difference the first and second projected points.

8. The system of claim 7, wherein the modified estimated feature point position is along a depth axis extending from the estimated physical camera pose to the estimated landmark position and at a distance along the depth axis corresponding to a distance from the estimated physical camera pose to the estimated feature point position.

9. The system of claim 1, wherein the error comprises a first term corresponding to a horizontal projected error component of the 3D error and a second term corresponding to a vertical projected error component of the 3D error on the image plane of the virtual camera.

10. The system of claim 9, wherein the error further comprises a third term corresponding to a horizontal error between a projection of the estimated feature point position on an image plane of the camera and a projection of the estimated landmark position on the image plane of the camera and a fourth term corresponding to a vertical error between the projection of the estimated feature point position on the camera image plane of the camera and the projection of the estimated landmark position on the camera image plane of the camera.

11. A method for performing simultaneous localization and mapping comprising:
receiving an estimated physical camera pose for a camera within an environment, an estimated landmark position for a landmark within the environment, and an estimated feature point position for the landmark;
determining, based on the estimated physical camera pose, the estimated feature point position, and the estimated landmark position, a virtual camera pose within the environment, wherein the virtual camera pose is offset in a horizontal and a vertical direction with respect to the estimated physical camera pose;
determining a projected depth error corresponding to a 3D error between the estimated feature point position and the estimated landmark position on an image plane corresponding to the virtual camera pose;
generating an error corresponding to the landmark, the error comprising the projected depth error; and
determining at least one of a new estimated physical camera pose or a new estimated landmark position using the error corresponding to the landmark.

12. The method of claim 11, wherein the error comprises a first term corresponding to a horizontal projected error component of the 3D error and a second term corresponding to a vertical projected error component of the 3D error on the image plane of the virtual camera.

13. The method of claim 11, wherein determining the virtual camera pose comprises:
determining a modified estimated feature point position for the estimated feature point position, wherein the modified estimated feature point position is along a depth axis extending from the estimated physical camera pose to the estimated landmark position and at a distance along the depth axis corresponding to a distance from the estimated physical camera pose to the estimated feature point position; and
generating the virtual camera pose at a position from the estimated physical camera pose that is aligned with a projection of a vector from the estimated feature point position to the modified estimated feature point position to the image plane and at a predetermined distance from the physical camera pose.

14. The method of claim 11, wherein determining the projected depth error comprises:
projecting a modified estimated feature point position for the estimated feature point position to a first projected point on the image plane of the virtual camera;
projecting the estimated landmark position to a second projected point on the image plane; and
differencing the first and second projected points.

15. The method of claim 14, wherein the modified estimated feature point position is along a depth axis extending from the estimated physical camera pose to the estimated landmark position and at a distance along the depth axis corresponding to a distance from the estimated physical camera pose to the estimated feature point position.

16. At least one non-transitory machine readable medium comprising a plurality of instructions that, in response to being executed on a device, cause the device to perform simultaneous localization and mapping by:
receiving an estimated physical camera pose for a camera within an environment, an estimated landmark position for a landmark within the environment, and an estimated feature point position for the landmark;
determining, based on the estimated physical camera pose, the estimated feature point position, and the estimated landmark position, a virtual camera pose within the environment, wherein the virtual camera pose is offset in a horizontal and a vertical direction with respect to the estimated physical camera pose;
determining a projected depth error corresponding to a 3D error between the estimated feature point position and the estimated landmark position on an image plane corresponding to the virtual camera pose;
generating an error corresponding to the landmark, the error comprising the projected depth error; and
determining at least one of a new estimated physical camera pose or a new estimated landmark position using the error corresponding to the landmark.

17. The non-transitory machine readable medium of claim 16, wherein determining the virtual camera pose comprises:
determining a modified estimated feature point position for the estimated feature point position, wherein the modified estimated feature point position is along a depth axis extending from the estimated physical camera pose to the estimated landmark position and at a distance along the depth axis corresponding to a distance from the estimated physical camera pose to the estimated feature point position; and
generating the virtual camera pose at a position from the estimated physical camera pose that is aligned with a projection of a vector from the estimated feature point position to the modified estimated feature point position to the image plane and at a predetermined distance from the physical camera pose.

18. The non-transitory machine readable medium of claim 16, wherein the error comprises a first term corresponding to a horizontal projected error component of the 3D error and a second term corresponding to a vertical projected error component of the 3D error on the image plane of the virtual camera.

19. The non-transitory machine readable medium of claim 16, wherein determining the projected depth error comprises:
projecting a modified estimated feature point position for the estimated feature point position to a first projected point on the image plane of the virtual camera;
projecting the estimated landmark position to a second projected point on the image plane; and
differencing the first and second projected points.

20. The non-transitory machine readable medium of claim 19, wherein the modified estimated feature point position is along a depth axis extending from the estimated physical camera pose to the estimated landmark position and at a distance along the depth axis corresponding to a distance from the estimated physical camera pose to the estimated feature point position.

* * * * *